US011350191B2

(12) United States Patent
Van Hoof et al.

(10) Patent No.: US 11,350,191 B2
(45) Date of Patent: May 31, 2022

(54) OPTICAL LINE TERMINAL AND A METHOD THEREFOR

(71) Applicant: Nokia Solutions and Networks Oy, Espoo (FI)

(72) Inventors: Werner Van Hoof, Aartselaar (BE); Rene Bonk, Pforzheim (DE); Robert Borkowski, Ludwigsburg (DE)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 17/096,286

(22) Filed: Nov. 12, 2020

(65) Prior Publication Data

US 2021/0185418 A1    Jun. 17, 2021

(30) Foreign Application Priority Data

Dec. 13, 2019    (EP) ..................................... 19216020

(51) Int. Cl.
*H04Q 11/00* (2006.01)
*H04B 10/2507* (2013.01)

(52) U.S. Cl.
CPC ... *H04Q 11/0066* (2013.01); *H04B 10/25073* (2013.01)

(58) Field of Classification Search
CPC ............ H04B 10/5055; H04B 10/5561; H04B 10/5161
USPC .................................................... 398/188, 48
See application file for complete search history.

(56) References Cited

U.S. PATENT DOCUMENTS

| 6,546,014 B1* | 4/2003 | Kramer ................ H04B 10/272 370/395.41 |
| 8,270,419 B2* | 9/2012 | Liva ........................ H04N 7/22 370/401 |
| 2003/0137975 A1* | 7/2003 | Song .................. H04Q 11/0062 370/353 |

(Continued)

FOREIGN PATENT DOCUMENTS

| JP | 2017-152773 A * 8/2017 ......... H04B 10/2507 |
| JP | 6513589 B2    5/2019 |

OTHER PUBLICATIONS

European Search Report for European application No. 19216020 dated Jul. 10, 2020.

*Primary Examiner* — Abbas H Alagheband
(74) *Attorney, Agent, or Firm* — Harness, Dickey & Pierce, P.L.C.

(57) ABSTRACT

Various example embodiments of the present disclosure relates to a physical layer, PHY, circuitry for an optical line terminal, OLT, the PHY circuitry being configured to receive a control signal including an identification of a transmitting ONT for pre-loading an equalization configuration associated with the identification of the transmitting ONT. Other example embodiments relate to a medium access control, MAC, circuitry for OLT, the MAC circuitry being configured to determine an upstream allocation map for optical network terminals, ONTs, and to generate a control signal for a PHY circuitry including synchronization information for receiving upstream optical signal bursts from a transmitting ONT and an identification of the transmitting ONT based on the upstream allocation map. Further example embodiments related to an optical line terminal, OLT, and a method therefor.

14 Claims, 4 Drawing Sheets

(56) References Cited

U.S. PATENT DOCUMENTS

| | | | | |
|---|---|---|---|---|
| 2003/0179769 A1* | 9/2003 | Shi | ............... | H04J 3/1694 370/442 |
| 2004/0114592 A1* | 6/2004 | Kang | ............... | H04Q 11/0067 370/389 |
| 2007/0195817 A1* | 8/2007 | Denney | ............... | H04N 21/6168 370/468 |
| 2008/0095532 A1* | 4/2008 | Yamaji | ............... | H04J 3/1694 398/17 |
| 2008/0267630 A1* | 10/2008 | Qian | ............... | H04J 14/0298 398/89 |
| 2009/0132751 A1* | 5/2009 | Simmons | ............... | G06F 13/385 711/5 |
| 2010/0158530 A1 | 6/2010 | Soto et al. | | |
| 2010/0235512 A1* | 9/2010 | Beser | ............... | H04L 12/2801 709/226 |
| 2011/0255866 A1* | 10/2011 | Van Veen | ............... | H04B 10/07955 398/35 |
| 2012/0243638 A1* | 9/2012 | Maltsev | ............... | H04W 52/0235 375/316 |
| 2013/0125194 A1* | 5/2013 | Finkelstein | ............... | H04N 21/2383 725/129 |
| 2014/0233950 A1* | 8/2014 | Luo | ............... | H04Q 11/0067 398/66 |
| 2015/0139647 A1* | 5/2015 | Soto | ............... | H04Q 11/0067 398/58 |
| 2016/0080102 A1* | 3/2016 | Fang | ............... | H04L 27/2626 398/74 |
| 2017/0105061 A1* | 4/2017 | Kim | ............... | H04Q 11/0067 |
| 2018/0034579 A1* | 2/2018 | Liu | ............... | H04B 10/272 |
| 2018/0145757 A1* | 5/2018 | Weeber | ............... | H04J 14/0227 |
| 2018/0183443 A1* | 6/2018 | Tebbe | ............... | H04B 10/00 |
| 2019/0007133 A1* | 1/2019 | Soto | ............... | G01M 11/3145 |
| 2019/0025401 A1* | 1/2019 | Vazhenin | ............... | H04W 4/029 |
| 2020/0204257 A1* | 6/2020 | Krampl | ............... | H04Q 11/0071 |

* cited by examiner

OPTICAL LINE TERMINAL AND A METHOD THEREFOR

CROSS-REFERENCE TO RELATED APPLICATIONS

This patent application is based on and claims priority pursuant to 35 U.S.C. § 119 to European Patent Application No. 19216020.8 filed on Dec. 13, 2019, the entire disclosure of which is hereby incorporated by reference herein.

TECHNICAL FIELD

Various example embodiments relate to a physical layer, PHY, circuitry and medium access control, MAC, circuitry. Further example embodiments relate to an optical line terminal, OLT, and a method therefor.

BACKGROUND

In an optical network (passive or active) an Optical Line Terminal, OLT is coupled to multiple Optical Network Terminals, ONT, in respective optical endpoints via an Optical Distribution Network, ODN. The ODN typically has a tree and branch architecture and comprises optical fibres and passive splitters/combiners that split the optical signals in the downstream directions from the OLT to the ONTs, and, multiplexes the optical signals in the upstream direction from the ONTs to the OLT. The downstream communication from the OLT to the ONTs is performed by broadcasting data for different ONTs in separate timeslots. In the upstream direction, each ONT is assigned a time slot to transmit its data towards the OLT, resulting in a burst communication.

Due to different optical path losses in the ODN and variations in transmitter power of the different ONTs, the signal arriving at the OLT consists of a sequence of burst with significant amplitude variations and unpredictable phase from one burst to the next. Moreover, in high-speed optical networks, for example 25 Gbit/s and 50 Gbit/s passive optical networks, the transmission rate of the bursts is further limited by the significant chromatic dispersion which creates Inter-Symbol Interference, ISI.

SUMMARY

Amongst others, it is an object of embodiments of the present disclosure to provide an OLT with an improved upstream burst reception.

The scope of protection sought for various embodiments of the invention is set out by the independent claims.

The embodiments and features described in this specification that do not fall within the scope of the independent claims, if any, are to be interpreted as examples useful for understanding various embodiments of the invention.

This object is achieved, according to a first example aspect of the present disclosure, by a physical layer, PHY, circuitry comprising:
  a converter circuitry configured to digitize upstream optical signal bursts received from respective optical network terminals, ONTs, to digitized upstream signal bursts;
  an equalization, EQ, circuitry configured to derive data bitstreams from the respective upstream signal bursts based on pre-determined equalization configurations of the EQ circuitry associated with the respective ONTs;
  wherein the PHY circuitry is further configured to receive a control signal from a medium access control, MAC, circuitry, and wherein the control signal comprises an identification of a transmitting ONT, and, wherein the EQ circuitry is configured to preload a pre-determined equalization configuration associated with the identification of the transmitting ONT.

An equalization circuitry may comprise one or more filters which cancel out the phase delay between the frequency components in a signal while preserving its waveform. Due to the different fibre lengths and differences between the ONT's transmitters, the upstream optical signal bursts from different ONTs are affected differently.

As one of the functionalities of a MAC layer circuitry is to allocate transmission opportunities to the different ONTs, the MAC layer circuitry has the information on the next transmitting ONT readily available. By embedding this information in the control signal, the PHY circuitry gains knowledge on the next transmitting ONT.

By deriving the identification of the transmitting ONT from the control signal received from the MAC circuitry, the EQ circuitry is preloaded with a pre-determined equalization configuration associated with the identification of the transmitting ONT. The received upstream optical signal burst may therefore be equalized in an optimal way, because the equalization is performed from the beginning of the received upstream bursts based on the equalization configuration for the transmitting ONT. Therefore, the upstream burst transmission from the ONTs can be dedicated more to data reception rather than to long training sequences. Therefore, a PHY circuitry with an improved burst reception and therefore the OLT circuitry is enabled.

According to example embodiments, the control signal comprises a bitstream having bits encoding the identification of the transmitting ONT. The number of bits required for encoding the identification of the transmitting ONT depends on the number of ONTs in the optical network. For example, seven bits may be enough for the encoding of the identification of the transmitting ONT. However, if the optical network comprises a limited number of ONTs, a smaller number of bits may suffice, and vice versa. The identification of the ONTs may be an identifier uniquely identifying the transmitting ONT.

By encoding the identification of the transmitting ONT in the control signal, the EQ circuitry may be preloaded with the pre-determined equalization configuration associated to the transmitting ONT, thereby avoiding the need for a long training sequence.

According to other example embodiments, the control signal is indicative for the start of the upstream optical signal bursts. Accordingly, the start of the bitstream may be indicative for the start of the upstream optical signal bursts. Furthermore, the control signal may comprise a length information indicative for the length of the upstream optical signal bursts. Accordingly, the length information may be related to a length of said bitstream. In other words, the control signal transmitted by the MAC circuitry to the PHY circuitry may be used as a synchronisation signal comprising indication for at least one of the start time and/or length of the upstream optical signal bursts.

By encoding the start and the length of the upstream optical signal bursts, the operation of the PHY circuitry may be synchronized with burst transmission of the ONTs. In particular, by encoding information about the start time of the upstream burst allows to reset the PHY circuitry to a state ready to receive the upstream burst from the transmitting ONT, while encoding the length of the upstream burst allows to indicate the end of the upstream burst. The PHY circuitry can then use this information for example to shield the clock and data recovery circuitry and EQ circuitry from inter-burst-noise. Furthermore, it allows the EQ circuitry to further optimize the pre-loaded equalization configuration during the active burst.

This allows the clock and data recovery circuitry to generate a local clock with the same frequency and phase as the received upstream burst. Thereby, by generating a local clock synchronized in frequency and phase with the received upstream burst, the PHY circuitry will be clocked in sync with the received upstream burst which allows the upstream optical signal burst to be received correctly.

A signal indicating the start of burst transmission from the MAC circuitry may already be available for synchronization purposes of the PHY circuitry. Existing implementations of OLT circuitries and therefore optical networks implementation may be therefore easily improved by embedding the identification of the transmitting ONT into such a signal.

According to example embodiments, the control signal may be further configured to indicate a quiet window for joining of an ONT. Different possible bitstream configurations for encoding a quiet window may be envisaged. For example, the bits in the bitstream may be set to a high logical value. Alternatively, the first bit and the one or more idle bits may be set to a high logical value, while the bits encoding the identification of the transmitting ONT may be set to a low logical value.

Upon receipt of the quiet window the PHY circuitry may be configured to a so-called ranging mode. The means the PHY circuitry is set to a state ready to receive the upstream burst from an ONT joining the optical network. Accordingly, the EQ circuitry is configured to determine a new equalization configuration associated with the joining ONT. The determined equalization configuration is then stored in a storage circuitry, i.e. the look-up table, which allows the EQ circuitry to be pre-loaded when a transmission from the joining ONT is expected.

By encoding a quiet window in the control signal, the PHY circuitry may be pre-set to a ranging mode in a simple and an efficient way. The need of an additional control signal is avoided. Furthermore, this allows interface between the PHY circuitry and the MAC circuitry to be further simplified.

According to example embodiments, the PHY circuitry further comprises a circuitry configured to decode the identification of the transmitting ONT from the control signal and to retrieve the associated pre-determined equalization configuration. The circuitry may comprise a decoder configured to decode the identification of the transmitting ONT. The decoder may be further configured to decode the start time and the length of the upstream optical signal burst from the transmitting ONT.

Upon decoding the identification of the transmitting ONT the circuitry may retrieve from the storage circuitry the equalization configuration determined during the ranging phase. The circuitry may be further configured to pre-load the EQ circuitry with the pre-determined equalization configuration.

According to further embodiments, the PHY circuitry comprises a clock and data recovery, CDR, circuitry and a synchronizing circuitry. Further, the circuitry may be further configured to output reset signals for resetting at least one of a clock and data recovery, CDR, circuitry and a synchronizing circuitry of the PHY circuitry.

By resetting the clock and data recovery, CDR, circuitry and the synchronizing circuitry, the circuitries are pre-set to adequate initial values, allowing quick new burst acquisition and avoid inter-burst noise interference.

Additionally, the circuitry may be further configured to output a signal to pre-set an optical receiver configured to receive the upstream optical signal burst. By pre-setting the optical receiver to a state ready for reception of the upstream optical signal burst, the upstream optical burst is received correctly. Furthermore, the optical receiver may comprise an amplification circuitry with an automatic gain control. The optical receiver may be completely off because of a preceding noisy but silent period on the transmission medium. Therefore, by pre-setting the gain point of the optical receiver, it is assured that the upstream optical signal bursts are received correctly even if they have significant amplitude variations. Moreover, a faster settling of automatic gain control may be achieved.

According to example embodiments, the PHY circuitry comprising an electrical input pin configured to receive the control signal from the MAC circuitry. The electrical pin may be an input pin of the PHY circuitry standard interface. For example, the input pin typically used for signalling a start of burst transmission of a respective ONT may be re-used. This way a modification of the PHY circuitry standard interface is avoided.

According to a second example aspect a medium access control, MAC, circuitry is disclosed configured to determine an upstream allocation map for optical network terminals, ONTs, and wherein the MAC is further configured to generate a control signal for a physical layer circuitry, wherein the control signal comprises synchronization information for receiving upstream optical signal bursts from a transmitting ONT, the control signal further comprises an identification of the transmitting ONT based on the upstream allocation map.

The medium access control, MAC, circuitry is responsible for the assignment of a unique identifier to a respective ONT and for the determination of the upstream allocation map. Therefore, the MAC circuitry holds information on the identification of a transmitting ONT as well as a synchronization information such as the start time and length of its burst transmission.

Therefore, by configuring the MAC circuitry to output a control signal comprising synchronization information for receiving upstream optical signal bursts from a transmitting ONT and the identification of the transmitting ONT, the PHY circuitry may be pre-set to a state ready to reception of upstream optical signal bursts and the EQ circuitry may be preloaded with a pre-determined equalization configuration associated with the identification of the transmitting ONT. This way long preamble sequences required for the pre-set of the PHY circuitry are avoided. Furthermore, loss of upstream bandwidth is prevented and a high-speed operation of the PHY circuitry and therefore the OLT circuitry is enabled.

According to an example embodiment, the control signal further comprises identification of a length of the upstream optical signal bursts. The length indication allows for example to indicate the end of the upstream burst. The PHY can then use this information for example to shield the clock and data recovery circuitry and EQ circuitry from inter-burst-noise. Furthermore, it allows the EQ circuitry to optimize the pre-loaded equalization configuration further during the active burst.

According to a further example embodiment, MAC circuitry comprising an electrical output pin configured to output the control signal to the physical layer circuitry. The electrical pin may be an output pin of the PHY circuitry standard interface. For example, the output pin used for signalling a start of burst transmission of a respective ONT may be re-used. This way a modification of the MAC circuitry standard interface is avoided.

According to a third example aspect an optical line terminal, OLT, is disclosed comprising a PHY circuitry according to the first example aspect and a MAC circuitry according to the second example aspect.

According to a fourth example aspect a method is disclosed comprising:

by a medium access control, MAC, circuitry, determining an identification of a transmitting optical network terminal, ONT, based on an upstream allocation map, and sending a control signal comprising the identification of the transmitting ONT to a physical layer, PHY, circuitry; and by the physical layer, PHY, circuitry, receiving the control signal comprising the identification of the transmitting ONT, and preloading a pre-determined equalization configuration for the transmitting ONT based on the identification.

BRIEF DESCRIPTION OF THE DRAWINGS

Some example embodiments will now be described with reference to the accompanying drawings.

DETAILED DESCRIPTION OF EMBODIMENT(S)

To mitigate the effects of amplitude variations and unpredictable phase of the received upstream bursts as well as the effects of Inter-Symbol Interference, ISI, resulting from chromatic dispersion, a burst-mode electronic distortion (or dispersion) compensation is applied in the physical layer, PHY, circuitry. The burst-mode distortion compensation is performed by the equalization, EQ, circuitry which needs to determine the equalization configurations for the different ONTs in the optical network.

The optical network may be an active or a passive network, such as, a Broadband PON, BPON, an Ethernet PON, EPON, and a Gigabit PON, GPON, and others. The optical network may operate according to ITU-T G.8032 and IETF/ITU-T standards.

When joining an optical network, an ONT may undergo an activation procedure. Upon a successful activation procedure, the joining ONT becomes an active ONT. During the activation procedure, the equalization configuration for the ONT joining the optical network are determined by the PHY circuitry which may be stored in a storage circuitry. The storage circuitry may be a look-up-table which preserves the association between the determined equalization configuration and the respective ONT. This allows, during normal operation, the PHY circuitry to perform a burst-mode distortion compensation to the upstream burst transmission from the active ONTs based on their respective pre-determined equalization configuration.

During normal operation of the optical network, the transmitting ONT transmits a preamble sequence at the beginning of its burst transmission which limit the burst's transmission rate and leads to a waste of upstream bandwidth. Furthermore, PHY circuitry has no knowledge which ONT transmitted the upstream optical signal burst and hence the equalization is not optimal.

The MAC circuitry is responsible for determination of an upstream allocation map which comprises synchronization information such as start time and length of the burst transmission of the respective active ONTs in the optical network. By transmitting a control signal to the PHY circuitry embedding the identification of the transmitting ONT will allow to pre-load the EQ circuitry with the pre-determined equalization configuration associated with the transmitting ONT. This way, there is no need, for example, to first identify the transmitting ONT from the received upstream signal and then apply the pre-determined equalization configuration. This enables an improved burst reception. Further, the received burst transmission will be equalization in an optimal way, allowing burst transmission from the ONTs to be dedicated more to data reception.

Figure 1:
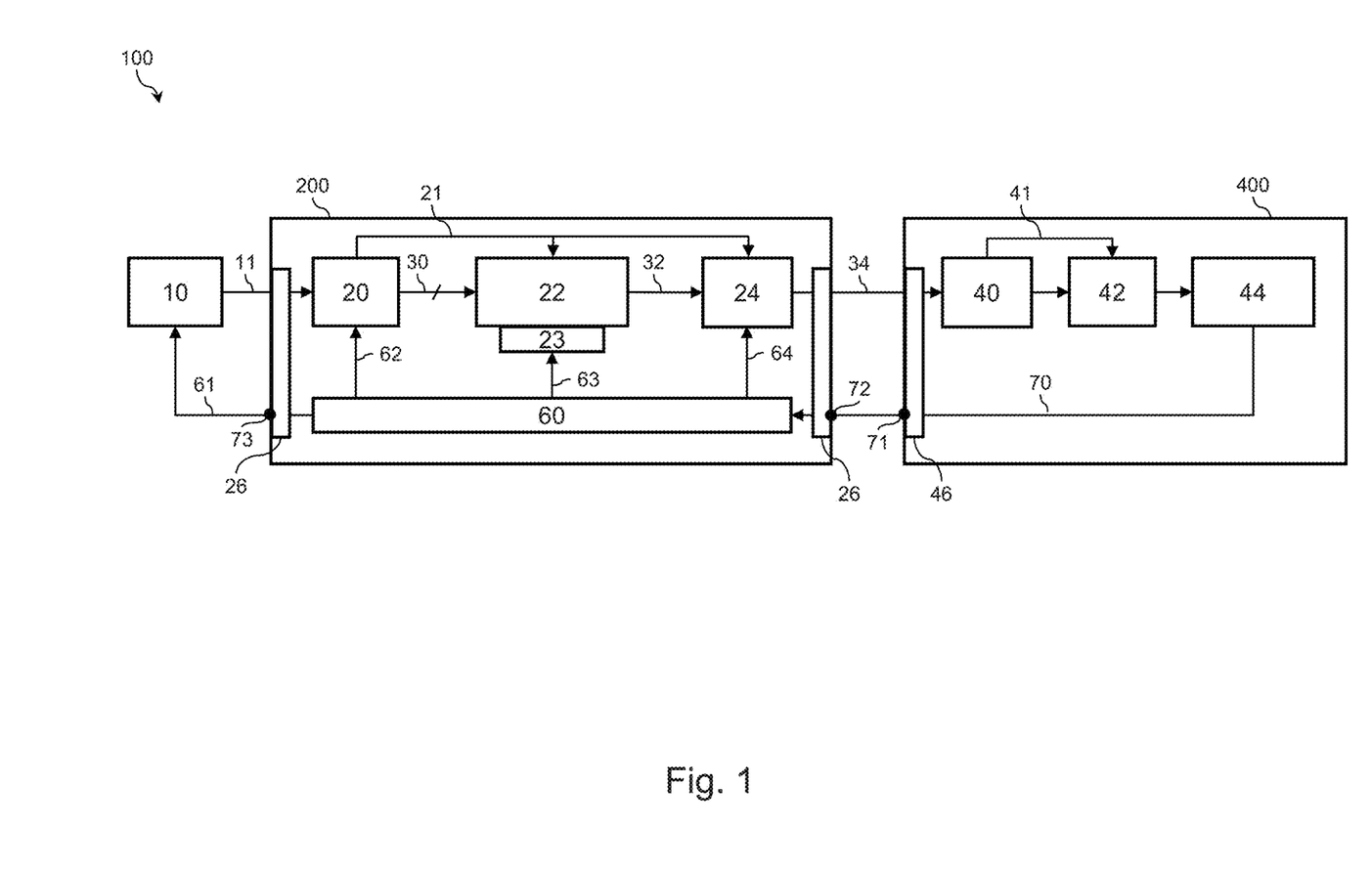
FIG. 1 shows an example embodiment of an OLT comprising a physical layer, PHY, circuitry and a medium access control, MAC, circuitry, according to the present disclosure.

FIG. 1 shows an example embodiment of optical line terminal, OLT, 100 according to the present disclosure. The OLT comprises an optical receiver 10, a physical layer, PHY, circuitry 200 and a medium access control, MAC, circuitry 400. The PHY circuitry implements the Physical Media Dependent, PMD, layer functionalities. The PHY circuitry 200 comprises a converter circuitry 20, an equalization, EQ, circuitry 22, a synchronization circuitry 24, a storage circuitry 23, an interface circuitry 26 and a control circuitry 60. The MAC circuitry 400 implements the medium access control, MAC, layer functionalities and comprises an interface circuitry 46, a clock and data recovery circuitry 40, a synchronization circuitry 42 and a MAC logic circuitry 44.

The MAC circuitry and, in particular, the MAC logic circuitry 44 determines the upstream allocation map. The MAC logic circuitry 44 is further configured to generate a control signal 70 which controls the operation of the PHY circuitry 200. The control signal 70 comprises synchronization information for receiving the upstream optical signal burst from a transmitting ONT as well as identification of the transmitting ONT based on the upstream allocation map. The control signal 70 is outputted by the MAC circuitry 400 via its input/output interface 46. The input/output interface 46 comprises an electrical output pin 71 configured to output the control signal 70 to the PHY circuitry.

The PHY circuitry 200 is configured to receive the control signal 70 via its input/output interface 26. The input/output interface 26 comprises an electrical input pin 72 configured to receive the control signal 70.

For example, the interface circuitries 26 and 46 may comprise a high-speed interface for data exchange, such as a gigabit Ethernet interface as defined by IEEE 802.3ab standard may be used. An example of such a high-speed interface is the Serializer/Deserializer, SerDes, interface. Further, the interface circuitries 26 and 46 may comprise a synchronous control interface, such as I2C interface, for exchanging control data.

The optical reset pin of the interface circuitries 26 and 46 may be reused as the input pin 72 and output pin 71.

Figure 4:
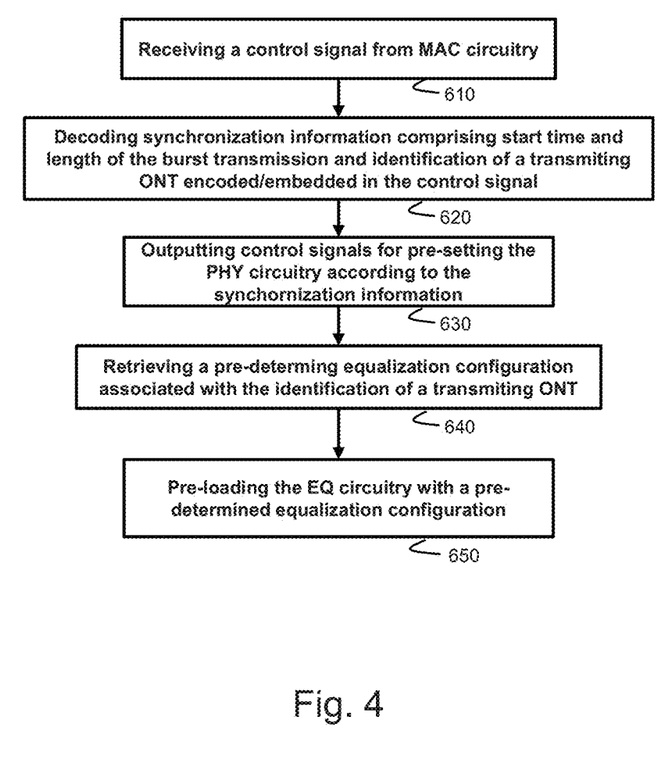
FIG. 4 shows a flow diagram showing the steps performed by the circuitry controlling the operation of the PHY circuitry according to the present disclosure.

The control circuitry 60 controls the operation of the PHY circuitry in accordance with the control signal 70. The functionality of the control circuitry 60 and the operation of the PHY circuitry will be explained in more detail below with reference to FIG. 4 showing a flow-chart illustrating the steps it performs.

The optical receiver 10 converts the received upstream optical signal bursts into electrical signal bursts 11. The electrical signal bursts 11 are then fed to the PHY circuitry 200, where the electrical signal bursts are digitized by the converter circuitry 20 so that a digitized electrical signal bursts 30 are obtained. The converter circuit 20 may oversample the electrical signal burst 30. For example, the sampling rate may be set to 1.2 the frequency of the electrical signal burst 30 or higher. The digitized signal bursts 30 are then fed to the equalization circuitry 22 which applies a burst-mode distortions compensation by equalizing the digitized electrical signal bursts 30. Therefore, the inter-symbol interference in the digitized signal bursts is compensated for. The EQ circuitry is allowed to have a variable processing time within certain boundaries. The MAC circuitry 400, on the other hand, requires upstream bursts with a fixed latency. The digitized and compensated signal bursts 32 are therefore fed to the MAC circuitry 400 for further processing via the synchronization logic 24 which assures that the digitized and compensated signal bursts 32 are with a fixed latency.

The circuitry 60 is configured to output control signals 61, 62, 63 and 64 in accordance with a control signal 70. The circuitry 60 receives 610 the control signal 70 and decodes 620 synchronization information comprising the start time and the length of the upstream optical signal bursts as well as the unique identifier of the transmitting ONT. Accordingly, the circuitry 60 outputs 630 control signals 61, 62 and 64 in accordance with the identified start time of the upstream optical signal bursts for synchronizing the PHY circuitry operation with the upstream burst transmission from the ONTs, wherein the control signal 61 is configured to pre-set the optical receiver 10 while control signals 62 and 64 are configured to reset the clock and data recovery circuitry (not shown in the figure) of the converter circuitry 20 and the synchronization circuitry 24, respectively.

In particular, the control signal 61 is configured to pre-set the automatic gain control of the amplifying circuitry (not shown) of the optical receiver 10 to a predefined gain point at the start of receipt of upstream optical bursts. For example, the automatic gain control may be pre-set to a mid-point. Control signal 61 is fed to the optical receiver 10 through the electrical output pin 73 of the interface circuitry 26.

Control signal 62 is configured to reset the clock and data recovery circuitry of the converter circuitry 20 and control signal 64 is configured to reset the synchronization circuitry 24 respectively. By resetting these circuitries the PHY circuitry 200 is reset to a state ready to receive the upstream burst from the transmitting ONT. In turn, the clock and data recovery circuitry generates a local clock 21 with the same frequency and phase as the received upstream burst. The local clock 21 is used to clock the converter circuitry 20, the EQ circuitry 22 as well as the synchronization circuitry 24. This way the operation of the PHY circuitry 200 is synchronized in frequency and phase with the received upstream burst which in turn allows the upstream optical signal burst to be received correctly so that the PHY circuitry may perform a correct data decision.

In addition to control signals 61, 62 and 64, the control circuitry 60 further outputs a control signal 63 which pre-loads the EQ circuitry with a pre-determined equalization configuration based on the decoded identifier information. Upon decoding the unique identifier of the transmitting ONT, the control circuitry 60 retrieves 640 the pre-determined equalization configuration associated with the decoded unique identifier from the storage circuitry 23 and pre-loads 650 the EQ circuitry with the retrieved pre-determined equalization configuration.

The exact timing relationship between the reset of the optical receiver 10, the reset of the CDR circuitry and the pre-loading of the EQ circuitry 22 may be optimized independently from each other.

Alternatively, the control circuitry 60 may forward the decoded unique identifier to the EQ circuitry 22, which upon receipt of the ONT's unique identifier, retrieves the pre-determined equalization configuration associated to the transmitting ONT from the storage circuitry 23. The EQ circuitry then pre-loads itself with the retrieved equalization configuration.

Figure 2:
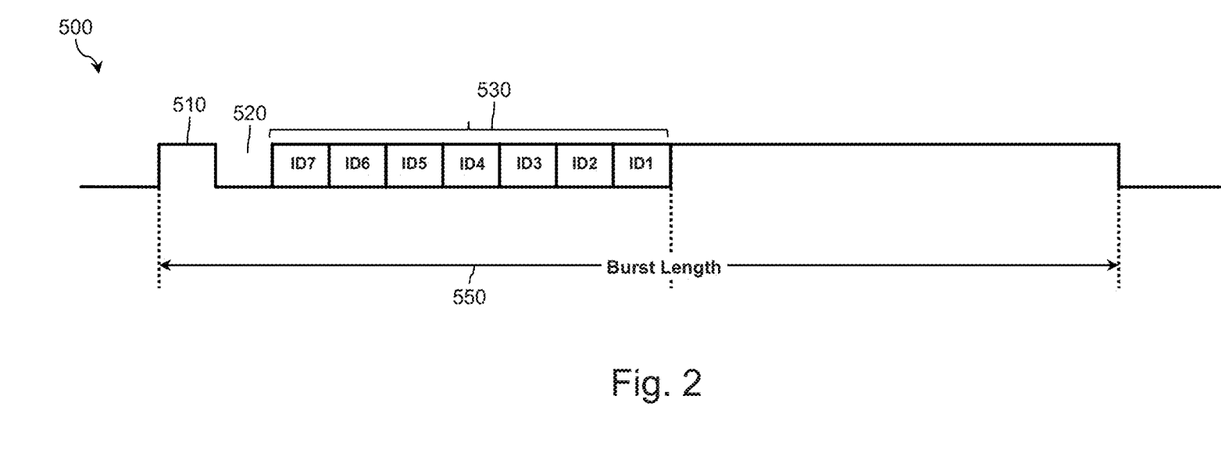
FIG. 2 shows an example embodiment of the control signal according to the present disclosure.

FIG. 2 shows an example of the control signal 70 comprising a bitstream with a length 550. The first bit 510 of the bitstream may be set to a high logical value to indicate a start of the upstream optical burst transmission while the length of the bitstream may be as indication of the length of the upstream optical signal burst. Further, bits 530 of the bitstream may be configured to encode the unique identifier of the transmitting ONT. The bits encoding the unique identifier of the transmitting ONT are separated from the first bit of the bitstream by one or more idle bits 520.

Figure 3:
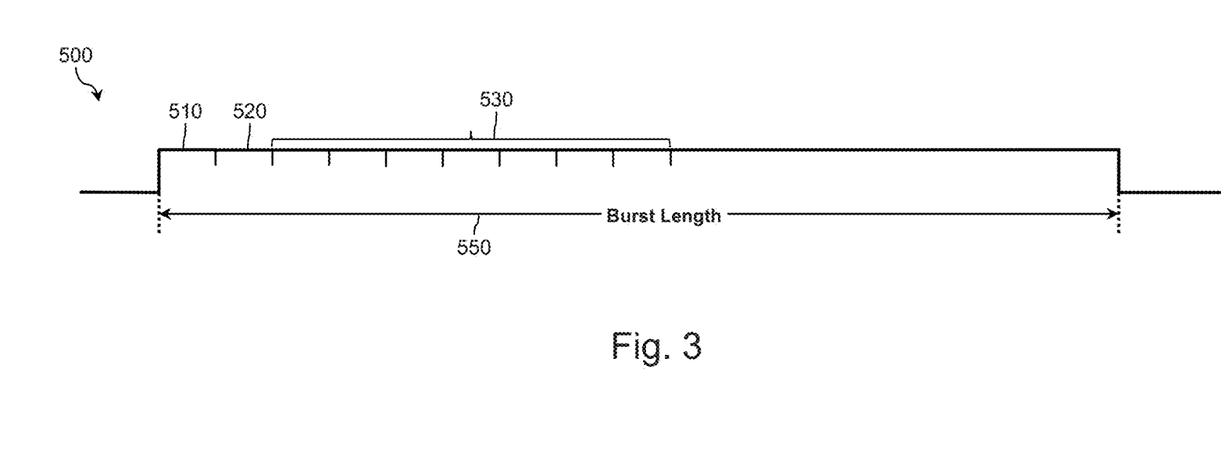
FIG. 3 shows another example embodiment of the control signal according to the present disclosure.

As detailed above, when joining an optical network, an ONT may undergo an activation procedure. During the activation procedure, the PHY circuitry must be pre-set for reception of burst transmission from the ONT joining the optical network. According to other example embodiments, the control signal 70 may be configured to indicate a quiet window during which upstream optical signal burst from the joining ONT are received as shown in FIG. 3. The control signal 70 comprises a bitstream with a length 550 and bits, for example, set to a high logical value. The start of the bitstream and its length are indicative for the start time and the length of the burst transmission from the joining ONT.

The bit duration in the bitstream may be set to for example 12.8 ns. The length of the upstream optical signal burst may be then set as an integer multiple of the bits. For example, an upstream burst length of 36.864 us may be encoded in a 2880 bits bitstream with a bit duration of 12.8 ns. The electrical standard of the signal can be for example Low-Voltage Transistor-Transistor Logic (LVTTL).

Figure 5:
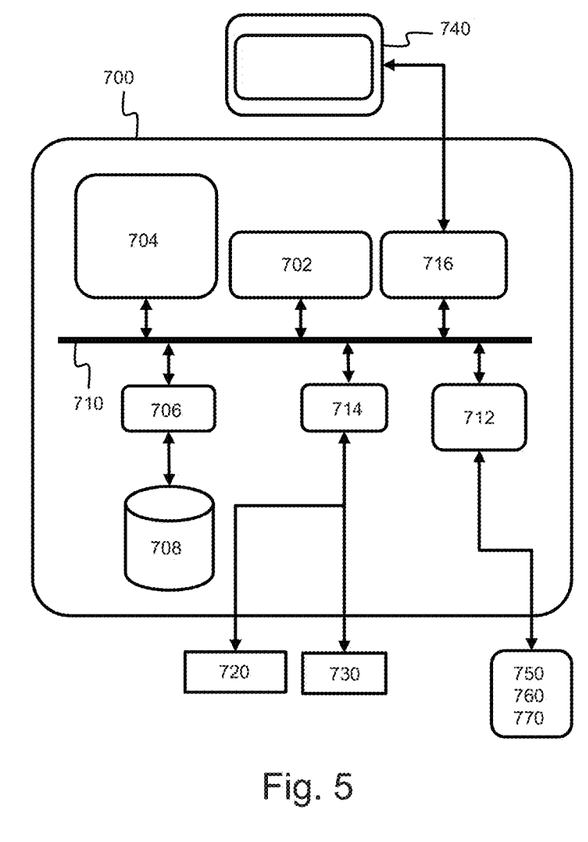
FIG. 5 shows an example embodiment of a suitable computing system for performing one or several steps in embodiments of the present disclosure.

FIG. 5 shows a computing system 700 suitable for performing various steps performed by an optical line terminal, OLT, in an optical network according to various embodiments of the present disclosure. Computing system 700 may in general be formed as a suitable general-purpose computer and comprise a bus 710, a processor 702, a local memory 704, one or more optional input interfaces 714, one or more optional output interfaces 716, a communication interface 712, a storage element interface 706, and one or more storage elements 708. Bus 710 may comprise one or more conductors that permit communication among the components of the computing system 700. Processor 702 may include any type of conventional processor or microprocessor that interprets and executes programming instructions. Local memory 704 may include a random-access memory, RAM, or another type of dynamic storage device that stores information and instructions for execution by processor 702 and/or a read only memory, ROM, or another type of static storage device that stores static information and instructions for use by processor 702. Input interface 714 may comprise one or more conventional mechanisms that permit an operator or user to input information to the computing device 700, such as a keyboard 720, a mouse 730, a pen, voice recognition and/or biometric mechanisms, a camera, etc. Output interface 716 may comprise one or more conventional mechanisms that output information to the operator or user, such as a display 740, etc. Communication interface 712 may comprise any transceiver-like mechanism such as for example one or more Ethernet interfaces that enables computing system 700 to communicate with other devices and/or systems, for example with other computing devices 750, 760, 770. The communication interface 712 of computing system 700 may be connected to such another computing system by means of a local area network, LAN, or a wide area network, WAN, such as for example the internet. Storage element interface 706 may comprise a storage interface such as for example a Serial Advanced Technology Attachment, SATA, interface or a Small Computer System Interface, SCSI, for connecting bus 710 to one or more storage elements 708, such as one or more local disks, for example SATA disk drives, and control the reading and writing of data to and/or from these storage elements 708. Although the storage element(s) 708 above is/are described as a local disk, in general any other suitable computer-readable media such as a removable magnetic disk, optical storage media such as a CD or DVD, —ROM disk, solid state drives, flash memory cards, . . . could be used.

According to the present disclosure, the communication interface 712 allows an OLT according various embodiments of the present disclosure to exchange control information and data with the ONUs 750, another OLT 760 in the optical network as well as an aggregation network 770. According to the example embodiments, the processor may be running a computer program code which allows the OLT to control the operation of its PHY circuitry in accordance with the bandwidth allocation map determined by its respective MAC circuitry. The processing is therefore configured to control the operation of the converter circuitry 20 and its clock and data recovery circuitry, the EQ circuitry 22, the control circuit 60 as well as the synchronization circuitry 24 and the storage circuitry 23. More specifically, during operation the MAC circuitry may receive, via the communication interface 712, information from the ONTs relating to their serial number, their status, etc, based on which the processor may determine an upstream allocation map. The processor will then instruct the received information as well as the determined upstream allocation map to be stored in the memory 704. Prior receipt of upstream optical signal bursts from a transmitting ONT, i.e. based on the upstream allocation map, the processor 702 will issue a control message comprising synchronization information and an identification of a transmitting ONT with which it will instruct the OLT circuitry and more specifically, its PHY circuitry, to: pre-set to a state ready for reception of upstream optical signal burst from a respective ONT; to retrieve a pre-determined equalization configuration from the memory 704 based on the identification of transmitting ONT; and to preload the EQ circuitry with the retrieved equalization configuration.

As used in this application, the term "circuitry" may refer to one or more or all of the following:

(a) hardware-only circuit implementations such as implementations in only analog and/or digital circuitry and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and/or processor(s), such as microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular network device, or other computing or network device.

Although the present disclosure has been illustrated by reference to specific embodiments, it will be apparent to those skilled in the art that the present disclosure is not limited to the details of the foregoing illustrative embodiments, and that the present disclosure may be embodied with various changes and modifications without departing from the scope thereof. The present embodiments are therefore to be considered in all respects as illustrative and not restrictive, the scope of the present disclosure being indicated by the appended claims rather than by the foregoing description, and all changes which come within the scope of the claims are therefore intended to be embraced therein.

It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the present disclosure are capable of operating according to the present disclosure in other sequences, or in orientations different from the one(s) described or illustrated above.

The invention claimed is:

1. A physical layer (PHY) circuitry configured to:
    digitize upstream optical signal bursts received from respective optical network terminals (ONTs) to digitized upstream signal bursts;
    receive a control signal from a medium access control (MAC) circuitry, the control signal including an identification of a transmitting ONT and at least one of a start of the upstream optical signal burst of the transmitting ONT or length information of the upstream optical signal burst of the transmitting ONT;
    preload an equalization configuration associated with the identification of the transmitting ONT; and
    derive a data bitstream from the digitized upstream signal burst of the transmitting ONT based on the equalization configuration.

2. The PHY circuitry according to claim 1, wherein the control signal comprises the length information, the length information indicating a length of the upstream optical signal burst.

3. The PHY circuitry according to claim 1, wherein the control signal is a synchronization signal for indicating the start of the upstream optical signal burst.

4. The PHY circuitry according to claim 1, wherein the control signal comprises a bitstream, and, wherein a start of the bitstream is indicative for the start of the upstream optical signal burst.

5. The PHY circuitry according to claim 4, wherein the bitstream comprises bits encoding the identification.

6. The PHY circuitry according to claim 2, wherein the length information is related to a length of said data bitstream.

7. The PHY circuitry according to claim 1, wherein the control signal is further configured to indicate a quiet window for joining of an ONT.

8. The PHY circuitry according to claim 7, further configured to determine a new equalization configuration associated with the joining ONT.

9. The PHY circuitry according to claim 1, further configured to decode the identification of the transmitting ONT from the control signal and to retrieve the associated equalization configuration.

10. The PHY circuitry according to claim 1, comprising an electrical input pin configured to receive the control signal from the MAC circuitry.

11. A medium access control (MAC) circuitry configured to:

determine an upstream allocation map for optical network terminals (ONTs); and generate a control signal for physical layer circuitry, wherein the control signal comprises an identification of the transmitting ONT based on the upstream allocation map and at least one of synchronization information for receiving upstream optical signal bursts from a transmitting ONT, or identification of a length of the upstream optical signal bursts.

12. The MAC circuitry, according to claim 11, wherein the control signal includes the identification of the length of the upstream optical signal bursts.

13. The MAC circuitry, according to claim 11, comprising an electrical output pin configured to output the control signal to the physical layer circuitry.

14. A method comprising:

by a medium access control (MAC) circuitry, determining an identification of a transmitting optical network terminal (ONT) based on an upstream allocation map, and sending a control signal to a physical layer (PHY) circuitry, the control signal comprising the identification of the transmitting ONT and at least one of a start of an upstream optical signal burst of the transmitting ONT or length information of the upstream optical signal burst of the transmitting ONT; and by the PHY circuitry, receiving the control, and preloading equalization configuration for the transmitting ONT based on the identification.

* * * * *